United States Patent [19]
Liu

[11] 3,851,524
[45] Dec. 3, 1974

[54] DYNAMOMETER TESTING USING PLURAL POWER ASORPTION MEANS

[75] Inventor: John K. Liu, Valley Forge, Pa.

[73] Assignee: Philadelphia Gear Corporation, King of Prussia, Pa.

[22] Filed: July 30, 1973

[21] Appl. No.: 383,710

[52] U.S. Cl. ................................................. 73/134
[51] Int. Cl. .............................................. G01l 3/20
[58] Field of Search ............ 73/116, 117, 134, 135, 73/133

[56] References Cited
UNITED STATES PATENTS

| | | | |
|---|---|---|---|
| 1,424,357 | 8/1922 | Hem | 73/134 |
| 3,050,993 | 8/1962 | Draughon et al. | 73/134 |
| 3,072,146 | 1/1963 | Gizeski | 310/94 X |
| 3,330,153 | 7/1967 | Perna, Jr. | 73/116 |
| 3,363,455 | 1/1968 | Vanderbilt, Jr. | 73/117 UX |
| 3,364,736 | 1/1968 | Bathurst et al. | 73/134 |
| 3,577,777 | 5/1971 | Whelan | 73/133 |

FOREIGN PATENTS OR APPLICATIONS

| | | | |
|---|---|---|---|
| 909,702 | 1/1946 | France | 73/134 |

*Primary Examiner*—Charles A. Ruehl
*Attorney, Agent, or Firm*—Paul & Paul

[57] ABSTRACT

Apparatus to be tested is coupled through a bullgear and pinion arrangement to a plurality of waterbrakes. The difference between measured present loading by the brakes and input loading demands is scaled for use as a control signal. In response to the control signal select ones of the plural waterbrakes are energized. More particularly, the use of the individual brakes is incremental, with individual ones being energized only when the control signal is within a corresponding range.

10 Claims, 4 Drawing Figures

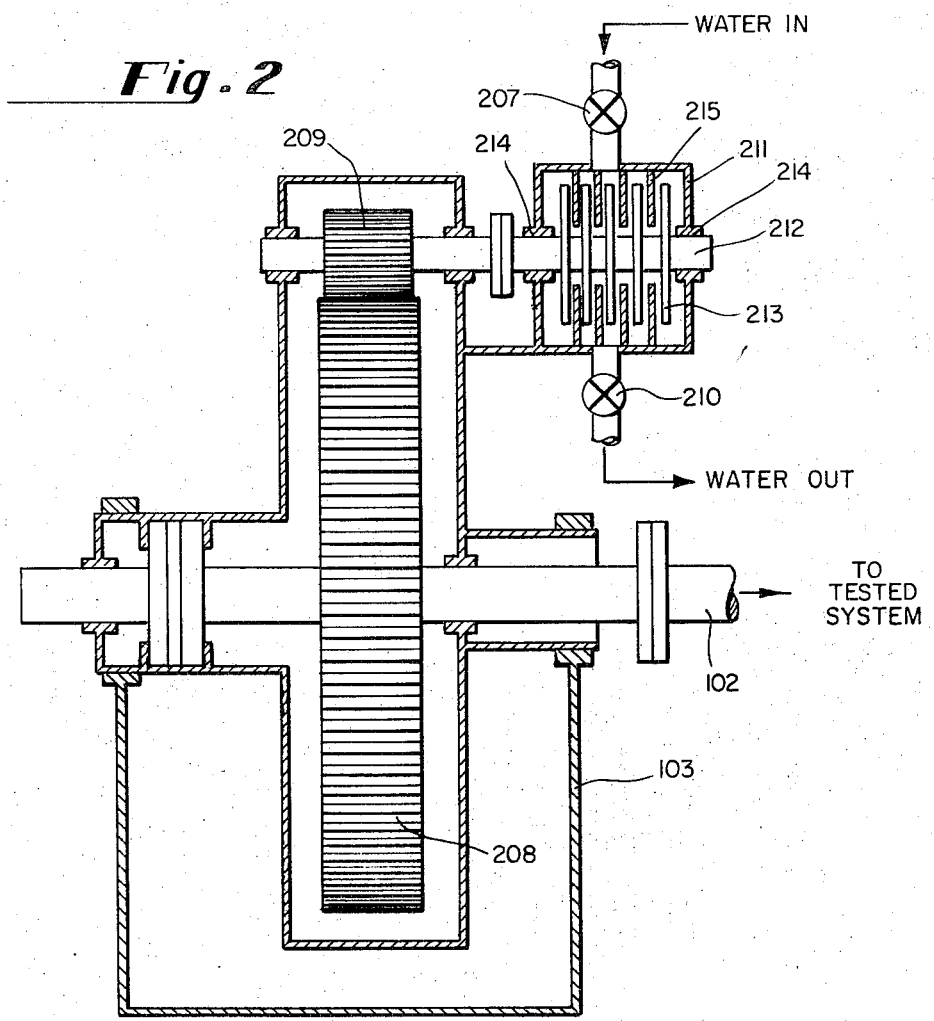

DYNAMOMETER TESTING USING PLURAL POWER ASORPTION MEANS

BACKGROUND OF THE INVENTION

This invention relates to apparatus for the testing of large prime movers or systems. More particularly, it relates to automatic control apparatus and methods for testing high power, high torque, low speed engines or gearing systems.

The performance evaluation of large propulsion systems and prime movers has for some time presented considerable problems. For example, such systems include combination turbine and gearing systems sufficiently large to drive major ships. Not only are the operating speeds involved relatively low, but the torques are extremely large. Consequently, the general goal of evaluation of the combined machinery under realistic steady state and transient loading while accounting for all relevant factors has not fully been realized.

The most common prior art approach to such testing and evaluation has utilized a single, relatively large waterbrake. That is, most prior art systems utilize a single waterbrake which includes a large chamber having a driven shaft through its center, and rotors extending outwardly from the shaft. In proportion to the quantity of water in the chamber, the resistance of the turning shaft and plates is affected proportionally. Therefore, the load imposed by the waterbrake simulates varying load conditions for the machinery being tested.

Prior attempts to use waterbrakes for dynamometer testing have not been entirely satisfactory. Not only are the prior art systems quite large (e.g., more than 1,000 gallons of enclosed fluid might be required), but they also possess many unsatisfactory operating characteristics. Currently, surprisingly little technology is available for large waterbrake systems. Due to the extremely large amount of inertia involved, large waterbrake control systems have poor transient response. Moreover, their reliability is suspect, and once designed, they accord little or no design flexibility. In other words, once a large waterbrake system is designed to meet the testing needs of a particular set of power generating apparatus, little or nothing can be done effectively to adapt that system to the testing needs of other apparatus. Certainly, the incorporation of further apparatus compounds, rather than reduces, the problem of testing accuracy.

Other testing apparatus which has been used for large dynamometer systems includes single large electrical generators, air compressors, and eddy current absorbers. All have proven inadequate in some respects, and, notwithstanding the foregoing drawbacks, large, single unit waterbrakes have been the most often-used for large dynamometer testing.

It is accordingly a primary object of the present invention to provide methods and apparatus for testing and evaluation of large dynamometer systems without involving the traditional problems of priorly used single unit waterbrake systems. Further objects of the present invention include high functional reliability, high sensitivity both to the operating conditions of the machinery being tested and to the testing demands imposed, flexibility of design and operation, and a high rate of transient response.

SUMMARY OF THE INVENTION

The present invention constitutes methods and means for testing large dynamometer systems by utilizing a multiplicity of small energy absorbing means. Basically, the principles of the present invention are grounded on the use of a multiplicity of smaller energy absorbing means, timed to interact with the tested machinery on a predetermined basis. As a result, the transient response, reliability and flexibility problems associated with prior art systems are obviated. In accordance with the principles of the present invention, a plurality of separate, relatively small power absorbing means are utilized in parallel with one another. Moreover, the energizing and the operation of each is carefully temporally related to that of all others. That is, while several elements are simultaneously available for loading the tested machinery, only select ones of them are used at any given time, depending upon the present load demands to be placed upon the tested system. In accordance with the method prescribed, the status of each of the several energy absorbing means is monitored at all times. This present status is compared to present loading demand specifications, and responsively thereto, the operation of one or more of the energy absorbing means is successively altered.

In an illustrative embodiment of the present invention, the shaft from the system being tested is passed into the drive portion of a large central gear known as a bullgear, which in turn drives eight separate pinions, each pinion being associated with a relatively small waterbrake. The input and output flow to each waterbrake is separately controlled, with the result that the principal shaft is accordingly loaded through the bull gear and associated pinions. All rotating elements, waterbrakes and associated control valves are contained or attached to a single, rigid housing which is pivotally connected to a supporting frame, the pivot axis being coincident with the rotational axis of the bull gear or driven shaft. The torque reaction is thus free to rotate the housing about its pivotal axis, were it not for a restraining member, such as a load cell. Said load cell, then, provides a means of continuously and accurately measuring the loading torque. The difference between the present loading torque and the current demand torque is evaluated, indicating the amount of loading change which must be presently supplied by the several waterbrakes. Responsively thereto, select ones of the several waterbrakes are energized such that the number currently contributing to the load is dependent on the amount of change in loading torque presently desired. In particular, this is accomplished by variation of the position of inlet and outlet valves of associated waterbrakes. The control loop is thereby closed, and the changed output torque may be evaluated for further change in response subsequent demands.

It is a feature of the present invention that extremely high sensitivity is provided with no penalty to transient response. Moreover, the apparatus utilized is characterized by high reliability. Furthermore, due to use of a plurality of energy absorbing means, high design flexibility is accorded. Finally, the input control function may be accomplished by means of a variety of input methods.

SUMMARY OF THE DRAWINGS

FIG. 2 shows a cross section of suggested mechanical linkage between tested machinery and one of the plural waterbrakes;

FIG. 3 shows a transfer function utilized for control of the individual waterbrake units in accordance with the principles of the present invention.

DETAILED DESCRIPTION

In accordance with the principles of the present invention, the torque demand to which the machinery being tested is subjected may be provided in alternative manners. In the first, and simplest case, manual input may be given for example by means of a control potentiometer which may be manipulated by a human operator. As a second, and slightly more complex alternative, a predetermined analog signal representing successive demand torque values may be used as a system input. In a final, and still more complex method of driving the system, a multi-purpose digital computer, preprogrammed with prospective testing procedures, may be utilized. Clearly, this complex system of drives may utilize virtually any input parameters, such as a ship's pitch, etc. In any event, the type of input utilized is ancillary to the principles of the present invention.

Figure 1:
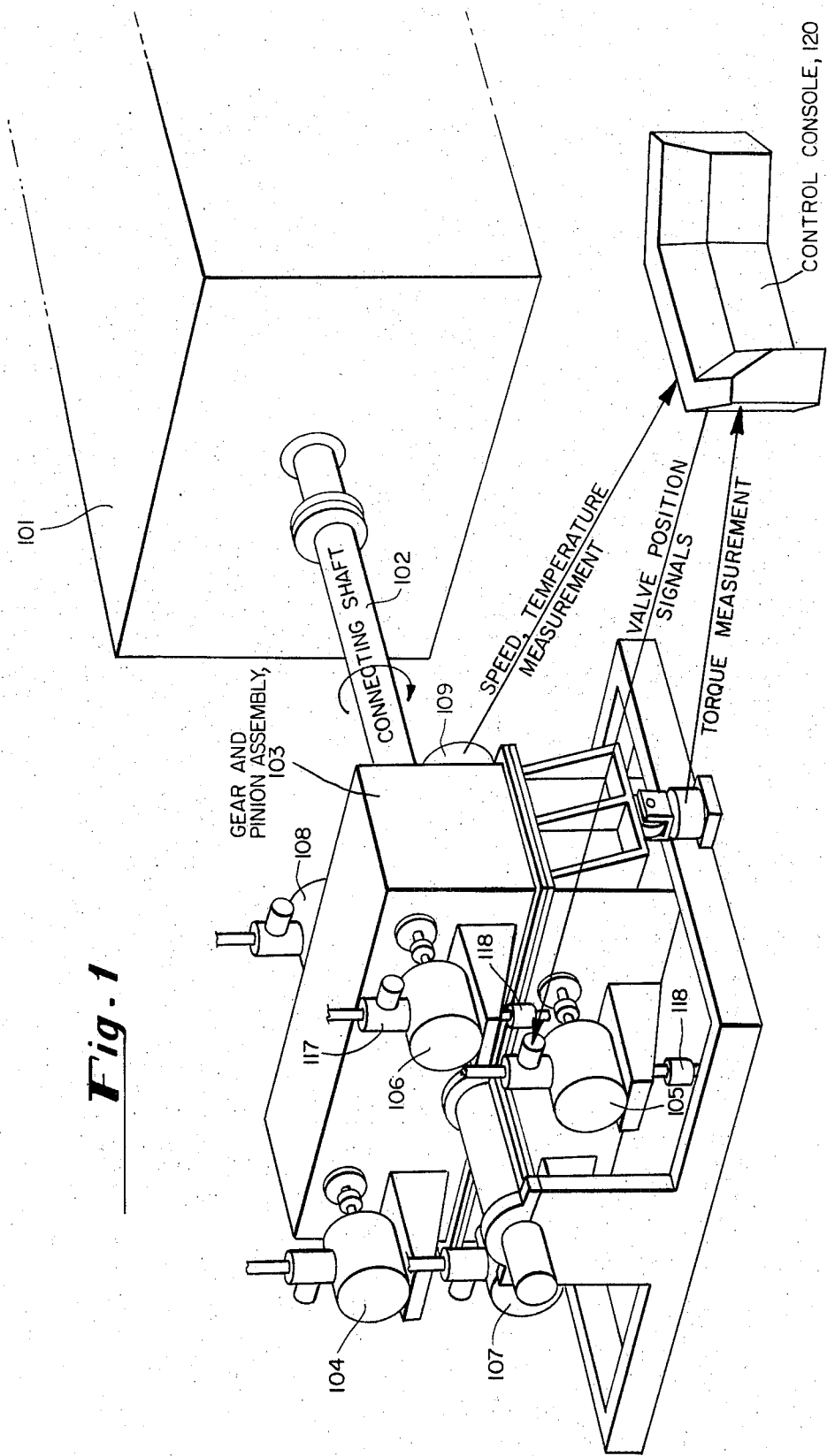
FIG. 1 shows an overall system diagram including turbine machinery to be tested, a plural waterbrake loading system, and a control unit.

FIG. 1 shows in abbreviated form a control system which embodies the principles of the present invention. A set of driving turbines with associated gearing apparatus is shown schemically as block 101. The driving machinery 101 is connected by means of a shaft 102 to a large piece of apparatus which includes a large housing 103 for a bull gear and a pinion system. This apparatus is shown in cross section in FIG. 2. Extending outwardly from the gear housing 103 is a series of waterbrakes 104 through 109 and others.

As disclosed hereinbefore, it is contemplated that the waterbrakes 104 through 109 be operated incrementally, rather than continuously, in response to the desired change of loading torque brought on by the instantaneous torque demand. Each of the waterbrakes, such as brake 106, has an inlet valve 117 and an outlet valve 118. It is by regulation of these valves that varying amounts of resistance torque is generated by the waterbrake, with concomitant torque loading to the connection shaft 102 and therefore to the tested apparatus 101.

As shown in FIG. 1, certain information is conveyed from the testing apparatus to the control console 120 for processing thereby. First, the temperature status of each of the waterbrakes is monitored. Also, the present loading torque is continuously evaluated and is passed to the control room. At the control console 120, this information is processed, utilized in a control method which embodies the principles of the present invention, and is translated into information which may be utilized by the apparatus of FIG. 1. Since the embodiment shown utilizes waterbrakes (i.e., as opposed to alternative absorption means, such as eddy current devices) to achieve the energy absorbing function, and further since waterbrakes are controlled solely by the position of associated inlet and outlet valves, the only information that needs to be produced at the console 120 and coupled back to the testing apparatus is a set of position commands for all the valves.

In summary, the apparatus of FIG. 1 illustrates the connection of engine and gearing apparatus which is being tested with its testing apparatus. More particularly, the testing apparatus contemplated includes a gearing assembly which runs a plurality of peripheral energy absorbing means, which preferentially include a series of waterbrakes. Various items of information, including torque, speed, and temperature are assembled, sent to a control room, and processed. In response to this processing, signals are synthesized which are conveyed back to control the inlet and outlet valves of the waterbrakes. In this fashion, the loading torque is varied in accordance with the overall control and testing objectives.

The operation of the testing apparatus of FIG. 1 may be further appreciated by consideration of a typical embodiment as shown in FIG. 2, which is a cross section view of the connecting shaft, the bull gear and pinion systems, and of the one of the waterbrakes, including its corresponding inlet and outlet valves.

In FIG. 2, the connection of the shaft 102 from the tested equipment 101 is shown relative to the gearing housing assembly 103. The shaft 102 is connected to a large gear known as a bull gear 208. Situated peripherally to the bull gear are two or more pinion gears 209 which have shafts 212 running therethrough, each connecting outwardly to a waterbrake. The waterbrake itself consists of an outer housing 211 supporting the shaft 212 in journals 213. Situated along the shaft 212 is a series of disks 213, etc., which are fixed to the shaft and therefore turn therewith. The intermediate disks 215 are fixed to housing 211 and do not rotate with the shaft 212. The disks may be perforated or smooth. Accordingly, water flows through the housing 211 to a specified extent, and a loading torque is imposed on the shaft 212. The flow of water through the housing 212 is dependent upon the positions of the inlet valve 207 and the outlet valve 210.

It should be noted at this point, however, that the principles of the present invention do not constitute the simple utilization of a waterbrake in combination with a bull gear and pinion arrangement as shown in FIG. 2. Rather, focus of the present invention involves the utilization of a multiplicity of energy absorbers such as brake 106 in FIG. 2, sequentially energized in accordance with the control methods which follow. The waterbrakes utilized herein are waterbrakes of drilled disk design. The valve control elements utilized to position the waterbrake valves are embodied for example, as Moore 771/P transducers and Moore 74 positioners, both of which are commercially available. All valves utilized herein are embodied for example, as Valtek Mark I control valves, which likewise are commercially available.

In a method which embodies the principles of the present invention, waterbrakes are successively energized depending upon the degree of change of loading torque called for. In accordance with the methods as disclosed hereinafter, a torque error control signal is developed in proportion to which the loading torque is to be changed, either in a positive or in a negative direction. Each of the waterbrakes, however, is meant to be energized at different values of the torque error control signal. That is, if only a small change in output torque is desired, the status of only a few, or perhaps one, of the waterbrakes are to be energized by altering the flow of water therein. In such a situation, the status of the remainder of the waterbrakes is to remain unchanged. In order to achieve this result, the waterbrakes are driven by a control circuit designated herein as a sequencer, which associates each of the individual waterbrakes with a distinctive voltage transfer characteristic of the form shown in FIG. 3. In that figure, the abscissa represents the corrected torque error signal ($E_{TC}$) which determines the operational state of the waterbrakes. The ordinate axis represents the absorber control signal ($E_{BN}$) which is to be applied to an individual waterbrake. For example, the voltage $E_{B1}$ controls the status of a first waterbrake, $E_{B2}$ the status of a second one, and so on. It may be noted that the transfer characteristic of FIG. 3 exhibits a fixed negative voltage $E_C$ followed by a linearly increasing voltage through some crossover point $V_C$, followed by a fixed positive output voltage $E_O$. As alternative to the central linear portion of the characteristic, a smooth curve waveshape may be used. In accordance with the principles of the present invention, each individual waterbrake is associated with a charateristic shaped as shown in FIG. 3, but translated along the $E_{TC}$ axis in accordance with the crossover points shown, $V_1$ through $V_8$ (for a system using eight energy absorbers). Therefore, only select ones of the waterbrakes will be energized by a given corrected torque error signal. For example, the solid lined characteristic 301 will result in an absorber control signal $E_{B6} = E_C$ when $E_{TC} = V_X$, while $E_{B1} = E_O$ when $E_{TC} = V_X$ for characteristic 302. The approximate interrelationship of all eight transfer characteristics is shown in sequencer block 518 of FIG. 4.

Figure 4:
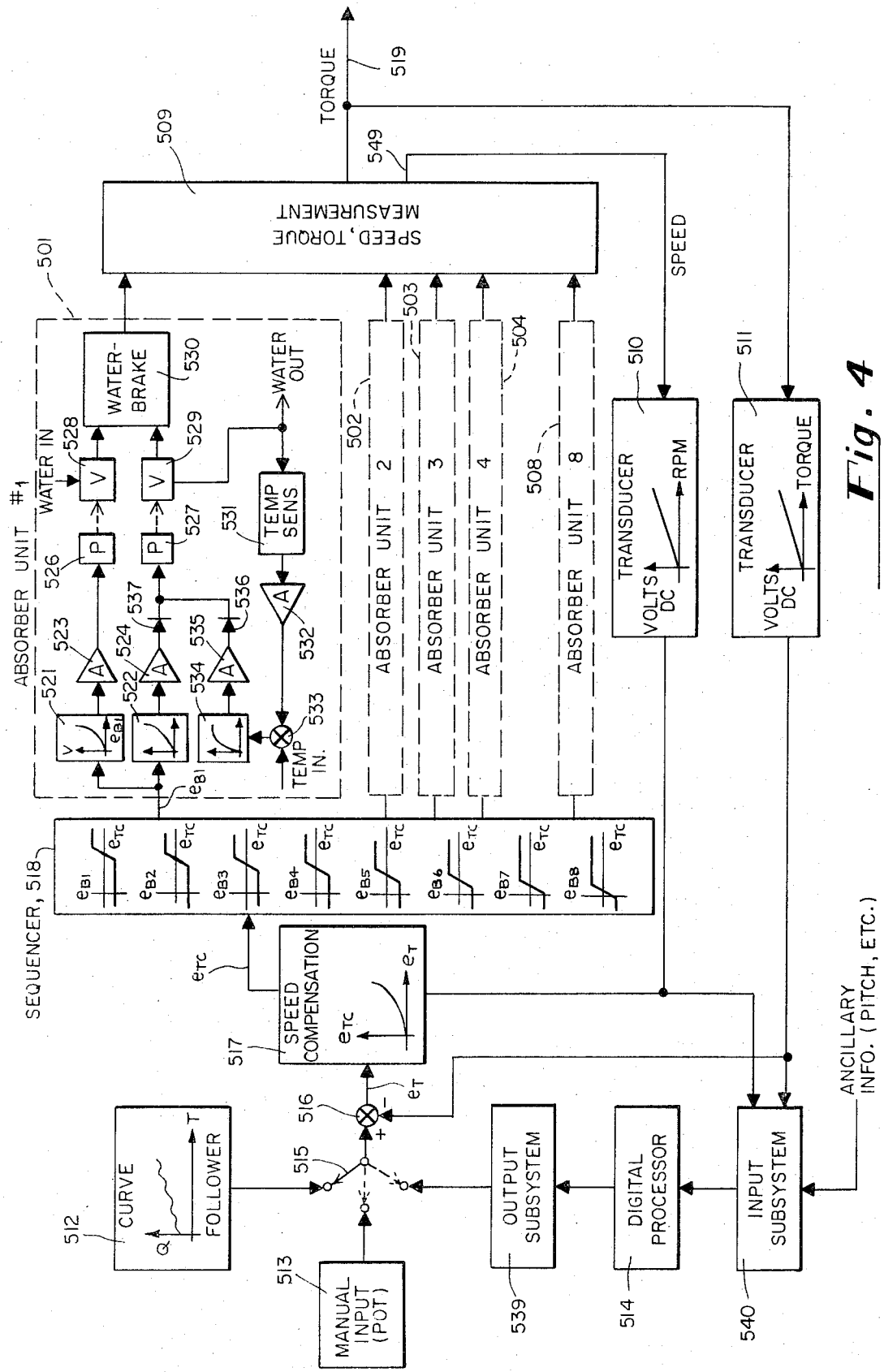
FIG. 4 shows in block diagramic form an illustrative embodiment of the principles of the present invention.

The block diagram of FIG. 4 shows a control loop which embodies the principles of the present invention. As shown in FIG. 4, waterbrakes are used as the power absorbing means, for example, waterbrakes 530. Therefore, in FIG. 4, the associated control apparatus for each of the energy absorption blocks constitutes inlet and outlet valves 528 and 529, plus associated apparatus is embodied as the aforementioned Moore and Valtek apparatus. Nevertheless, the particular sort of absorber used, along with its accompanying control apparatus, is independent of the principles of the present invention. Hence, many alternative arrangements might be obvious to one skilled in the art without departure from the spirit and scope of the principles of the present invention. For example, viscous shear absorbers, eddy current devices, and electrical generators and combinations thereof or combinations thereof with waterbrakes all may be advantageously employed.

In FIG. 4, eight separate absorber units 501 through 508 are shown. Each of these blocks represents a separate energy absorber including an individual waterbrake. Likewise, each of the braking blocks 501 through 508 includes all of control apparatus as shown in block form in the first braking block 501, detailed representation of all being omitted in FIG. 4 for sake of clarity. The precise number of absorbers to be used is left to the designer's option. Assuming that the system is operating at a given torque load, all of the waterbrakes are operating at some given level. For example, some or all of the associated inlet and outlet valves may be completely closed. The total torque being loaded onto the tested apparatus constitutes the sum of the loading torque of each of the individual brakes. Speed and torque are measured by apparatus 509, which is embodied as a combining gear, or alternatively as torque measurement converted appropriately by a transducer. Speed and torque are represented at output terminals 519 and 549. Both the speed and the torque values are fed back for combination with the input quantities. In FIG. 4, a transducer 510 converts speed, measured in R.P.M., to a voltage amplitude in the range of 1 to 10 volts DC. Likewise, the torque is converted by a transducer 511 to a similar DC voltage amplitude. The measured torque from converter 511 is coupled back the negative input of the summing junction 516. The positive input of the summing junction 516 is fed from a switch 515 by the input demand load. As described hereinbefore, this demand may be furnished by a manual setting through a potentiometer 513, by an input curve follower 512, or by a digial processor 514. In each case, the demand which is coupled via switch 515 to the positive input of the summing junction 516 is a voltage in the range 0 to 10 DC. Since the feed back torque from converter 511 is coupled to the negative input terminal of summing junction 516, the output thereof is a differential which represents the change in torque which must be imposed upon the tested system by means of the waterbrakes in order to change the load from the measured torque, fed back from output terminal 519, to the desired input torque which is received at switch 515. Basically, this differential is the one which stimulates select ones of the waterbraking means to impose extra or less load in the system.

Prior to direct control of the waterbrake, however, compensation is made at circuit 517 for the measured speed of the shaft. Because the relationship between brake water level and resultant torque is highly dependent upon shaft speed, (of the form torque = $K$ (speed)$^2$), the torque error is conditioned by a variable gain element as a function of shaft speed in order to linearize control loop dynamic response. This compensation would be unnecessary if an absorber having linear torque vs. speed characteristic were used. The output voltage from the compensation circuit 517 is the torque error signal $E_{TC}$ of FIG. 3.

The control voltage $E_{TC}$ as compensated from circuit 517 is coupled to a sequencer block 518. In reality, the sequencer 518 functions to determine which ones and how many of the waterbrakes are to be actuated in proportion to the control voltage, $E_{TC}$. In terms of embodiment, the sequencer involves eight separate control circuits, each one being associated with a different one of the absorber units 501 through 508. Moreover, each of the sequencer circuits has a transfer characteristic such as the one shown in FIG. 3, but offset from one another approximately as shown in FIG. 4. Preferentially, the offset variation among the eight separate crossover points is a linear one as a function of corrected torque error singal.

One embodiment of the sequencer 518 is as follows. Eight consecutive differential amplifiers are all connected such that they share a common input terminal. A precision voltage supply is uniformally divided over eight series resistors such that the voltage produced at the nodes between each of the resistors progesses linearly. The second input of each of the eight amplifiers is coupled to a different successive one of the nodes between the voltage dividing resistors. Each of the amplifier outputs is coupled to a different absorber unit 501 through 508. This embodiment fulfills the function shown for the sequencer 518 by utilizing the various divided voltages as a threshold for the operation of the amplifier. As the voltage $E_{TC}$ is coupled from the compensation circuit to the sequencer 518, the amplifiers are governed by the amplitude of $E_{TC}$ relative to the reference voltage provided by the appropriate divider resistors. Whenever $E_{TC}$ is zero, all amplifiers are in negative saturation, and the negative saturation voltage is coupled to all absorber units. This corresponds to the negative voltage $E_C$ of FIG. 3. As $E_{TC}$ increases, it gets to a stage for each amplifier where it approximates the magnitude of the voltage coupled to the other input terminal from the voltage dividing resistors. At such time, the amplifier assumes linear operation, and the amplifier output voltage increases linearly with the changed differential between $E_{TC}$ and the corresponding divided reference voltage. Whenever $E_{TC}$ becomes sufficiently large to drive a given amplifier into positive saturation, a fixed positive voltage corresponding to the quantity $E_O$ of FIG. 3 is coupled to the associated absorber units. In this fashion, each of the eight amplifier units operates the same to produce a wave form such as shown in FIG. 3, but the offsetting of the reference voltages provided from the resistive voltage divider to the second input terminal of each differential amplifier provides for an offset such that $E_{TC}$ voltages in different ranges cause the individual amplifier to swing from a state of negative saturation through a linear portion, and to a positive saturation voltage.

Each of the absorber units includes a pair of input valve control circuits 521 and 522, which operate responsively to the input voltage $E_{BN}$ from the sequencer 518. The voltage control circuits 521 and 522 operate in conjunction with amplifiers 523 and 524 to scale the small control voltages to levels sufficiently large to operate the valve positioning circuits 526 and 527. Hence, the application of voltages from the sequencer 518 through the valve control circuits 521 and 522 through amplifiers 523 and 524 and to the positioners 526 and 527 results in appropriate repositionings of the inlet valve and the outlet valve.

Each of the absorber units 501 through 508 of FIG. 4 entails a separate feedback branch for temperature compensation. Referring particularly to the first absorber unit 501, a temperature sensing means notes the temperature of the water as it is ejected from outlet valve 529. Amplification is provided by means of amplifier 532 in order to scale this temperature reading appropriately. Thereupon, the scaled temperature value is coupled to the negative input of a combining circuit 533. A temperature setpoint, which represents an operating temperature at which the waterbrakes should operate, is applied to the positive input of the summing junction 533, resulting in a differential which represents the amount of compensation which must be made in order to bring the operation of the waterbrake back to the desired temperature range. Accordingly, after wave shaping at transducer 534 and amplification at amplifier 535, the temperature differential is converted to a voltage in the operating range of the valve position control 527 of the outlet valve 529. If the measured temperature is too low, the positioner 527 causes outlet valve 529 to open slightly, allowing the net water flow rate through the waterbrake to decrease, thus increasing the water temperature toward the setpoint. Likewise, if the measured temperature within the waterbrake is too high, the resulting temperature differential causes the valve positioner 527 to close valve 539 slightly, thereby allowing further net circulation of water within the brake, with its concomitant cooling. In order to allow both the control input from the sequencer 518 and the temperature correction from the summing junction 533 to operate positioner 527, a pair of diodes 536 and 537 is provided, which merely block the signals in either branch from interfering with the others. Thus, the outlet valve 529 may be operated independently by both branches.

The following chart illustrates the loading characteristics of an eight waterbrake system of the type detailed hereinbefore. An "X" indicates that the corresponding brake is in use.

| MODE | BRAKE USED 1 2 3 4 5 6 7 8 | LOAD RANGE AS FRACTION OF TOTAL DYNAMOMETER CAPACITY |
| --- | --- | --- |
| 1 | X | 0 – ⅛ |
| 2 | X X | ⅛⁺ to ¼ |
| 3 | X X X | ¼⁺ to ⅜ |
| 4 | X X X X | ⅜⁺ to ½ |
| 5 | X X X X X | ½⁺ to ⅝ |
| 6 | X X X X X X | ⅝⁺ to ¾ |
| 7 | X X X X X X X | ¾⁺ to ⅞ |
| 8 | X X X X X X X X | ⅞⁺ to full |

In summary, the block diagram of FIG. 4 shows a combination of input, control, and feedback apparatus which permits the careful incremental sequencing of a plurality of separate energy absorber units. The functional relationship of the absorber units with one another is established by the successive overlaping transfer characteristics of the sequencer 518. These characteristics allow for incremental control of the plural absorber units, with the result that the previously defined beneficial results accrue.

A brief further word may be said regarding the operation of the digital processor 514 in providing input demand torque. The flexibility of such a system allows for detailed and rapidly changing load simulation procedures which are impossible to achieve either by means of the manual input 513 or of the curve follower 512. Hence, coupled to the input sub-system 540 of the digital processor is a provision for ancillary input information, such as pitch or the like, which may serve as simulation parameters. The information synthesized by the digital processor is coupled to an output sub-system 539 which scales the demand information appropriately for interaction with the fed back torque information from transducer 511.

Although the embodiments shown herein have included waterbrakes as energy absorbing units, it deserves restatement that the principles of the present invention are by no means limited thereto; rather, large numbers of absorbing units will be found applicable without departure from either the spirit or scope of the principles of the present invention.

What is claimed is:

1. A system for controlling the loading torque applied to specified machinery comprising:
    a. A plurality of energy absoring means;
    b. Gear means for coupling said machinery to said plurality of energy absorbing means;
    c. Means for measuring the present load torque applied to said machinery;
    d. Input means for specifying a load for application to said machinery; and e. Control means, responsive to the difference between said present load and the specified loading for actuating select ones of said plurality of energy absorbing means.

2. A system as described in claim 1, wherein said control means includes:
   a. Means responsive to the difference between said present load and the specified load for developing a control voltage;
   b. Means for actuating a number of said energy absorbing means proportional to said control voltage.

3. A system as described in claim 2 wherein said means for actuating comprises a plurality of voltage generating means, each corresponding to a different one of said energy absorbing means, a voltage generating means energizing its corresponding absorbing means when said control voltage is in a predetermined associated range.

4. A system as described in claim 1, wherein said plurality of energy absorbing means includes a plurality of waterbrake means, each having an inlet valve, an outlet valve, and internal flow resistance means, said machinery being coupled by said gear means to said flow resistance means, the positions of inlet and outlet valves regulating the loading capability of associated flow resistance means.

5. A system as described in claim 4 wherein each of said waterbrake means includes temperature compensation means for changing the position of one of the associated valves in order to achieve temperature stability.

6. In a system for evaluating the load withstanding capability of specified machinery by utilizing apparatus, driven by said machinery, which includes a plurality of waterbrakes, each producing a loading torque dependent on the water flow therein as established by the position of associated water flow valves, a method for establishing a given torque for said machinery comprising the steps of:
   a. Measuring the present speed of said waterbrakes;
   b. Measuring the present loading torque applied by said plurality of waterbrakes;
   c. Developing a difference function between said given torque and said present loading torque;
   d. Developing a control voltage in response to said difference function and to the present speed of said waterbrakes, and
   e. Energizing select ones of said plurality of waterbrakes in response to the amplitude of said control voltage.

7. A method as described in claim 6 wherein said first developing step includes:
   a. Producing a difference signal between said given torque and said present loading torque, and
   b. Scaling said difference signal in response to the present speed of said machinery.

8. A method as described in claim 6 wherein said energizing step includes:
   a. Opening the water flow valves of successive ones of said waterbrakes in proportional response to increases in said control voltage; and
   b. Closing the water flow valves of successive ones of said waterbrakes in proportional response to decreases in said control voltage.

9. A method as described in claim 6 wherein said step of measuring the present loading torque includes measuring the present flow of water in said plurality of waterbrakes, and evaluating from said present flow the present loading torque being applied to said machinery.

10. In a system for evaluating the load withstanding capability of specified machinery by utilizing apparatus, driven by said machinery, which includes a plurality of energy absorbing means, each selectively producing a loading torque, a method for establishing a given torque for said machinery comprising the steps of:
   a. Measuring the present speed of said energy absorbing means;
   b. Measuring the present loading torque applied by said plurality of energy absorbing means;
   c. Developing a difference function between said given torque and said present loading torque;
   d. Developing a control voltage in response to said difference function and to the present speed of said energy absorbing means, and
   e. Energizing select ones of said plurality of energy absorbing means in response to the amplitude of said control voltage.

* * * * *